(12) United States Patent  (10) Patent No.: US 8,362,896 B2
Smith  (45) Date of Patent: Jan. 29, 2013

(54) METHODS AND SYSTEMS FOR ALERTING PERSONS OF OBSTACLES OR APPROACHING HAZARDS

(75) Inventor: Steven L. Smith, Buford, GA (US)

(73) Assignee: United Parcel Service of America, Inc.

( * ) Notice: Subject to any disclaimer, the term of this patent is extended or adjusted under 35 U.S.C. 154(b) by 1023 days.

(21) Appl. No.: 12/051,476

(22) Filed: Mar. 19, 2008

(65) Prior Publication Data

US 2009/0237233 A1   Sep. 24, 2009

(51) Int. Cl.
*G08B 1/08* (2006.01)
(52) U.S. Cl. ............ 340/539.1; 340/539.21; 340/539.23; 340/825.69; 340/825.72; 340/7.57; 340/7.58
(58) Field of Classification Search ............... 340/539.1, 340/539.11, 539.21, 539.23, 384.4, 7.57, 340/7.58, 7.6, 825.69, 825.72; 704/270, 704/271, 274, 275
See application file for complete search history.

(56) References Cited

U.S. PATENT DOCUMENTS

| 7,075,427 | B1 * | 7/2006 | Pace et al. ................. 340/539.22 |
| 7,298,258 | B1 * | 11/2007 | Hudgens et al. ......... 340/539.13 |
| 7,356,473 | B2 * | 4/2008 | Kates ............................ 704/271 |
| 7,659,814 | B2 * | 2/2010 | Chen et al. .................... 340/540 |
| 2006/0167687 | A1 | 7/2006 | Kates |
| 2007/0241932 | A1 * | 10/2007 | Otero et al. ................... 340/901 |
| 2008/0247760 | A1 * | 10/2008 | Edmon et al. ................. 398/128 |
| 2009/0010466 | A1 * | 1/2009 | Haikonen ..................... 381/315 |

* cited by examiner

*Primary Examiner* — Hung T. Nguyen
(74) *Attorney, Agent, or Firm* — Alston & Bird LLP

(57) ABSTRACT

Apparatus and methods for alerting persons of obstacles and/or approaching hazards are provided. Embodiments may include a warning system that includes a radio source configured to transmit a radio signal and a warning device. The warning device may include at least one vibration device, at least two receiver devices configured to receive the radio signal, and a processing device operably coupled to at least two receiver devices and at least one vibration device, wherein the processing device is configured to determine at least a direction and a distance to the radio source from the warning device and configured to transmit a vibration signal to at least one vibration device based upon the determined direction and distance to the radio source from the warning device.

Figure 1:
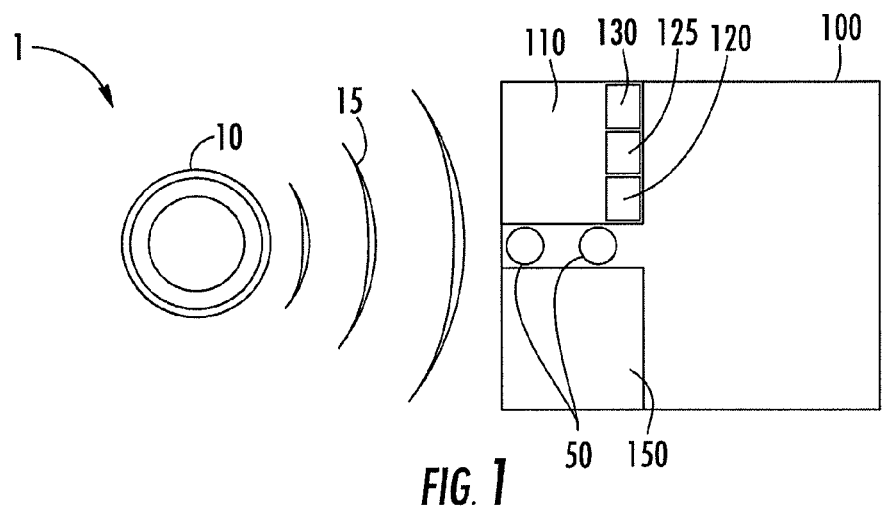

10 Claims, 4 Drawing Sheets

METHODS AND SYSTEMS FOR ALERTING PERSONS OF OBSTACLES OR APPROACHING HAZARDS

BACKGROUND OF THE INVENTION

Dangerous obstacles and approaching hazards can typically be sensed by sight or by hearing in most conditions. Hearing impaired and/or sight impaired people, however, need devices that allow for detection of dangerous obstacles, approaching hazards, and other unsafe conditions.

U.S. Publication No. 2006/0167687 to Kates includes a system that provides assistance to hearing impaired persons by processing sound signals. The system includes a headset with one or more microphones and a communication module that receives information from the microphones to ascertain various aspects of sounds received by the microphones, such as the direction of a sound. The system may also include one or more vibrators and a display to alert and warn the user. The display may give the user an indication of the direction of a sound, while the vibrators may vibrate to correspond to the relative level of perceived danger. While the system in Kates provides hearing impaired persons with some warning of sounds, it does so based upon whether the sound qualifies as a warning sound (e.g., horns, sirens, etc) and the potential level of danger indicated by the sound.

There is still a need for an assistance system for hearing and/or sight impaired persons that warns users of dangerous obstacles and hazards and also provides the user with specific messages that the user can use to avoid each obstacle and hazard.

BRIEF SUMMARY OF THE INVENTION

Embodiments of the disclosure may address the above needs and achieve other advantages by providing methods and systems for alerting persons of obstacles or approaching hazards. Generally, embodiments of the disclosure provide methods and systems for alerting persons of obstacles or approaching hazards by providing an audible and/or radio source, which is in some way related to the obstacle or hazard, that emits an audible and/or radio signal, respectively. The audible and/or radio signal may be received by at least two receiver devices of a warning device and processed by a processing device of the warning device to determine the direction and distance to the audible and/or radio source from the warning device. The warning device may then vibrate at least one vibration device to communicate a tactile message to the user regarding the direction and distance to the obstacle or hazard from the warning device.

In one embodiment, a warning system includes a warning device and a radio source that transmits a radio signal. The warning device includes at least one vibration device and at least two receiver devices that are adapted to receive the radio signal. The warning device may include a belt with four vibration devices positioned around the belt with corresponding receiver devices. The warning device also includes a processing device that is operably coupled to at least two receiver devices and at least one vibration device. The processing device is configured to determine at least a direction and a distance to the radio source from the warning device based upon the radio signal. The processing device is also configured to transmit a vibration signal to at least one vibration device based upon the determined direction and distance to the radio source from the warning device.

In another embodiment, a method of warning includes transmitting at least one radio signal from at least one radio source and receiving at least one radio signal by at least one warning device. A warning device includes at least one vibration device, at least two receiver devices, and a processing device. The method also includes the steps of determining at least a direction and a distance to at least one radio source from the warning device and producing at least one vibration signal based upon the determined direction and distance to at least one radio source from the warning device. The method also includes the steps of sending at least one vibration signal to at least one vibration device and vibrating at least one vibration device based upon at least one vibration signal.

In another embodiment, a warning system includes a warning device and an audible source configured to transmit an audible signal. The warning device includes at least two microphones configured to receive the audible signal, at least one vibration device, and a processing device operably coupled to at least two microphones and at least one vibration device. The warning device may include a belt with four vibration devices positioned around the belt with corresponding microphones. The processing device is configured to determine at least a direction and a distance to the audible source from the warning device. The processing device is also configured to transmit a vibration signal to at least one vibration device based upon the determined direction and distance to the audible source from the warning device.

BRIEF DESCRIPTION OF THE SEVERAL VIEWS OF THE DRAWING(S)

Figure 2:
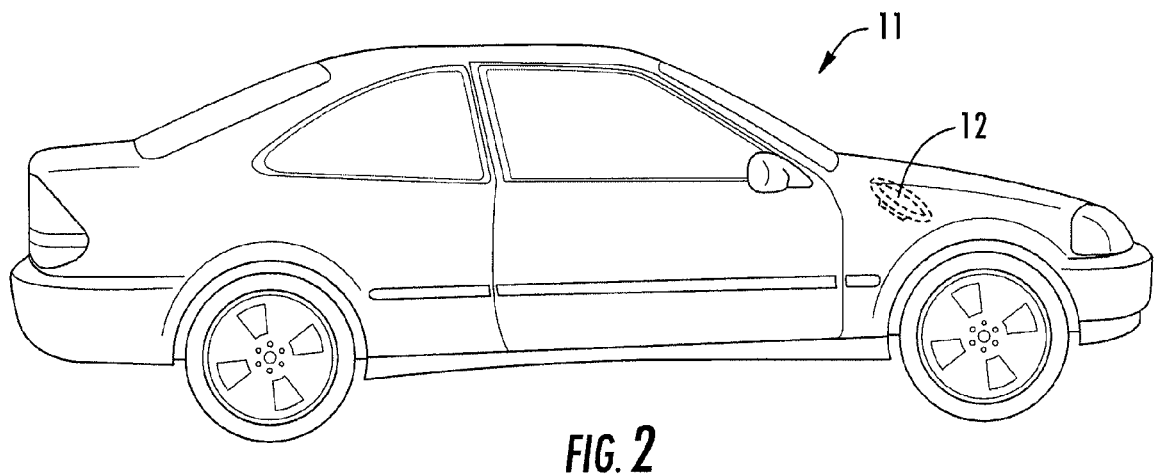
Figure 3:
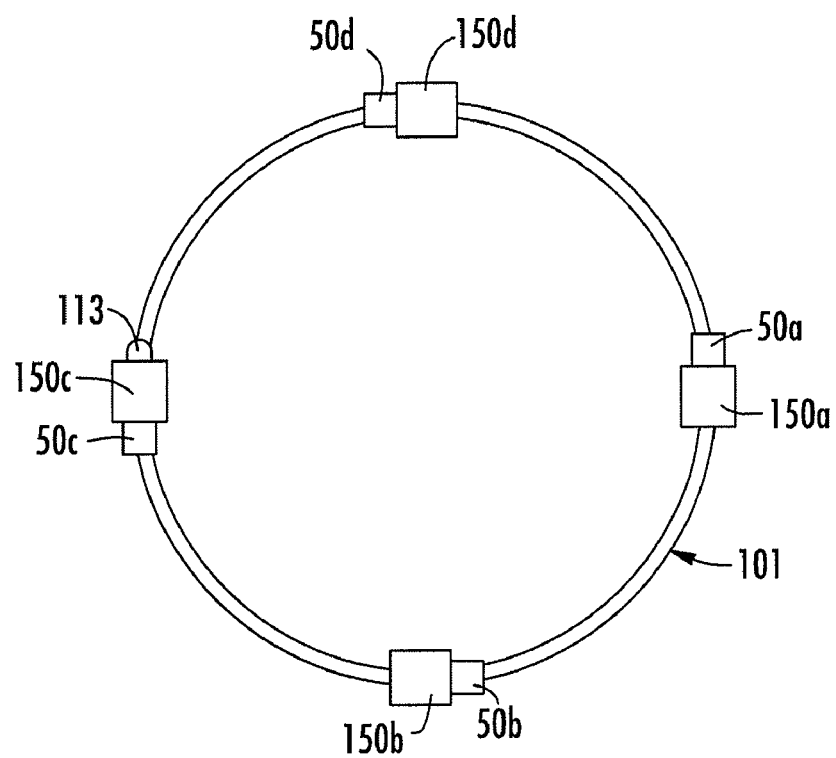
Figure 4:
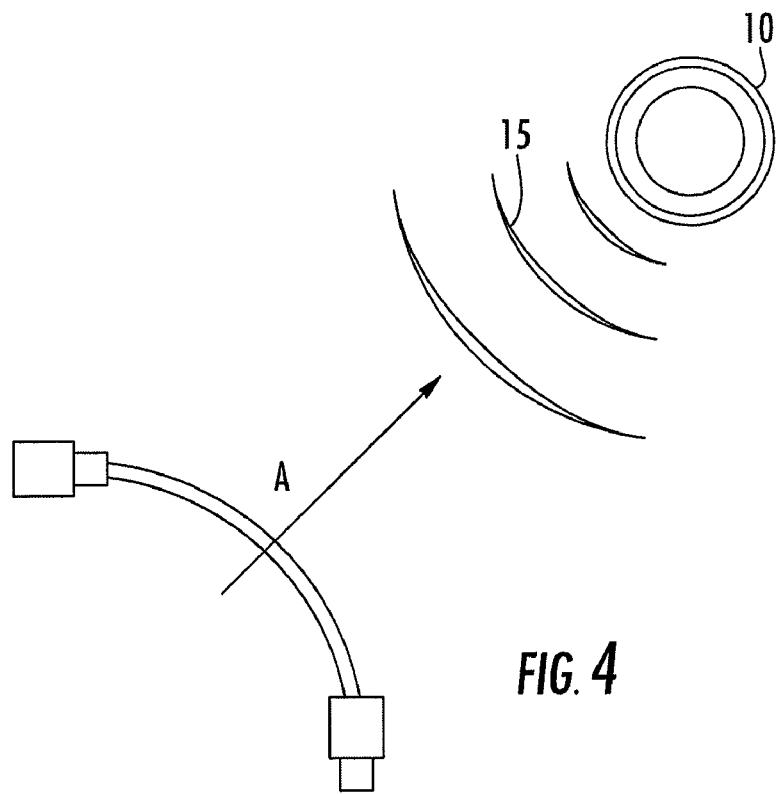
Figure 5:
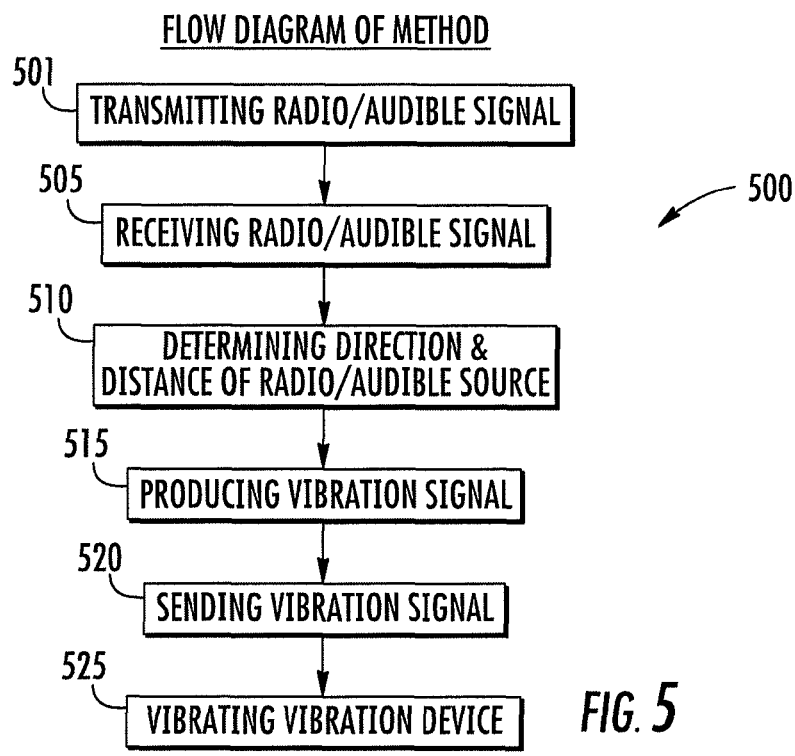
Figure 5A:
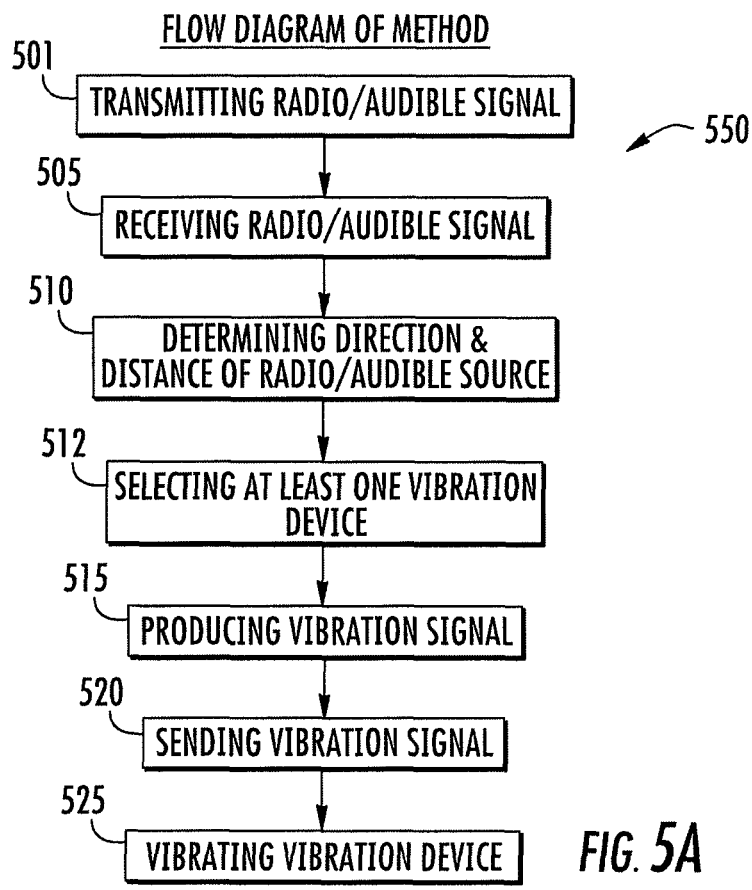
Figure 6:
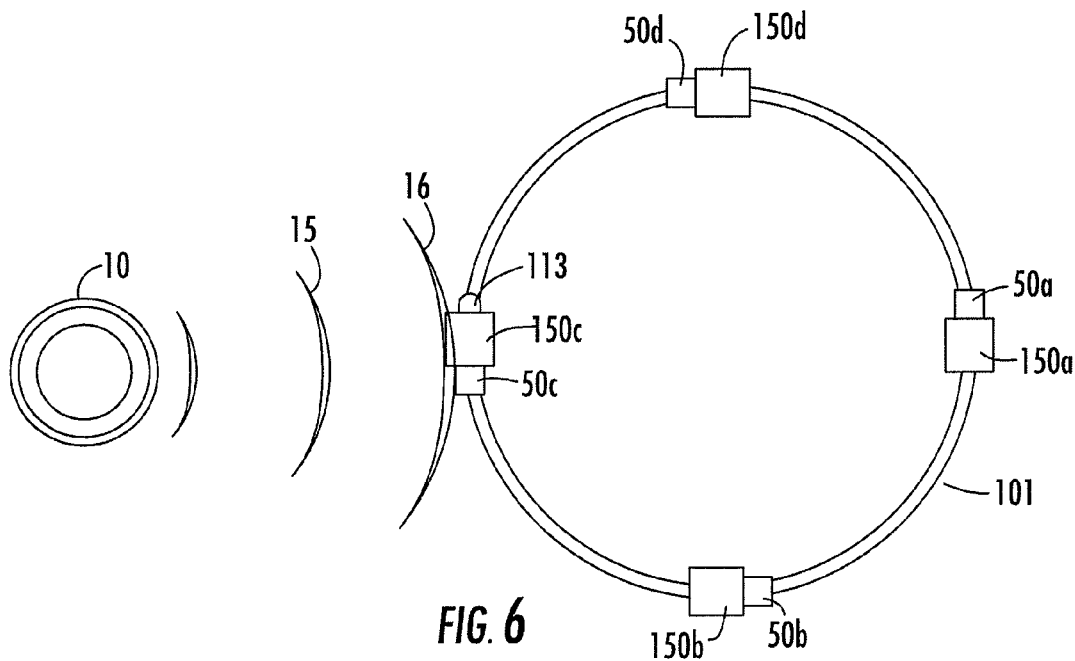
Figure 7:
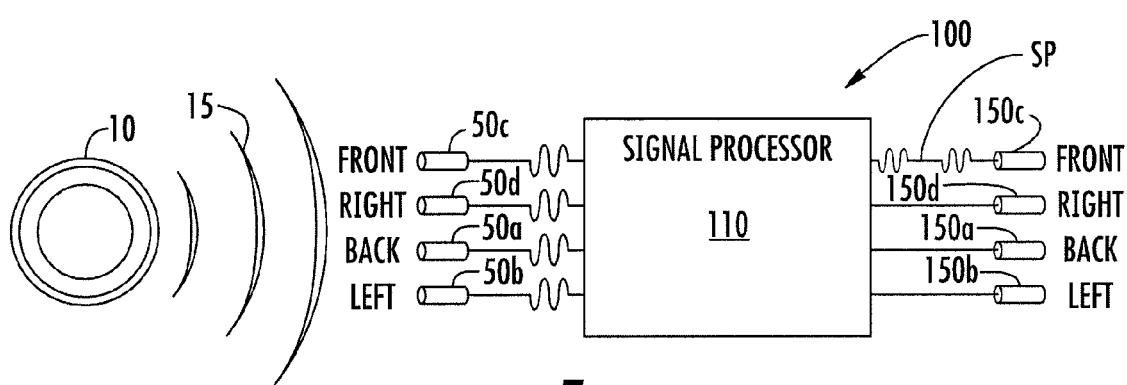
Figure 8:
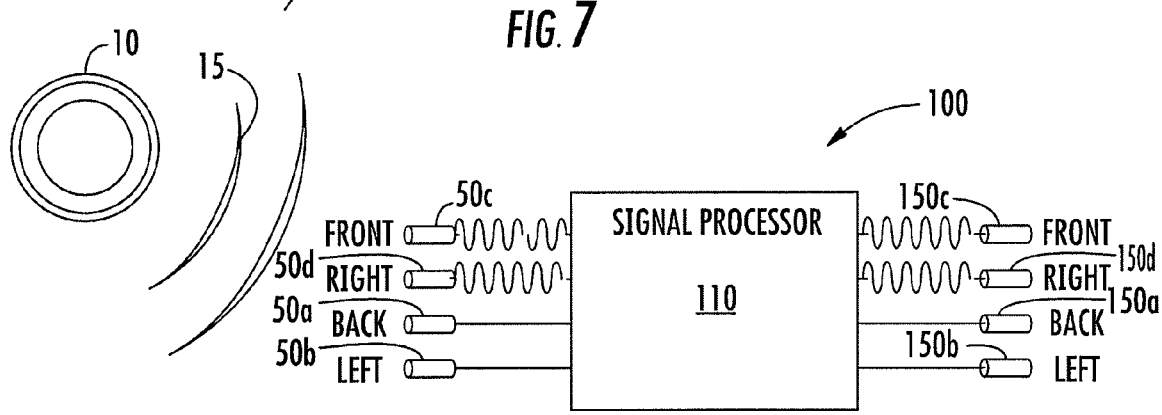

Having thus described the invention in general terms, reference will now be made to the accompanying drawings, which are not necessarily drawn to scale, and wherein:

FIG. 1 is an illustration of a warning system.
FIG. 2 is an illustration of a vehicle with a signal source.
FIG. 3 is an illustration of a belt warning device.
FIG. 4 is an illustration of a warning device with a signal source.
FIG. 5 is a block diagram of a method for alerting persons of obstacles and hazards.
FIG. 5a is a block diagram of a method for alerting persons of obstacles and hazards.
FIG. 6 is an illustration of a belt warning device and a signal source.
FIG. 7 is a linear illustration of a belt warning device and a signal source.
FIG. 8 is an illustration of a belt warning device and a signal source.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A warning system is provided that can be used in various settings to alert users of dangerous obstacles and approaching hazards. The warning system may serve, for example, to alert workers that are engaged in loading and unloading cargo of approaching shipping vehicles in noisy distribution centers. Of course, the warning system may also serve to alert hearing and/or sight impaired people of dangerous obstacles and approaching hazards in everyday life. The warning system 1 includes a radio and/or audible source 10 that transmits a radio and/or audible signal 15 as shown in FIG. 1. A radio source 10 may be any type of radio transmitter including a Wi-Fi enabled device, a Zigbee device, or the like. An audible source 10 may be any type of audible transmitter including a speaker or similar device. In general, the radio and/or audible source 10 may be a component of or attached to any obstacle or hazard that is dangerous to a sight impaired and/or hearing impaired person. The radio and/or audible source 10 may be a component 12 of a vehicle 11, as shown in FIG. 2. In fact, a radio and/or audible source 10 may become a standard part or component 12 for a vehicle 11, particularly as warning systems 1 are used more frequently by hearing and/or sight impaired individuals. Of course, radio and/or audible sources 10 may simply be attached to vehicles 11. For instance, a radio and/or audible source 10 may be attached to a side view mirror of an automobile. The radio and/or audible source 10 may be a component of or attached to various objects, such as automobiles, bicycles, or even people. City construction workers may, for example, attach a radio and/or audible source 10 to barricades that surround a construction work zone, which may include a hole in a sidewalk or other hazard.

Referring to FIG. 1, the warning system 1 also includes a warning device 100 that includes a vibration device 150, receiver devices 50, and a processing device 110. The vibration device 150 may be like a vibration system of a typical cell phone or pager or some other system configured to produce vibrations. The vibration device 150 may have various shapes, including a disk, a block, or a rod. A portion, multiple portions, and/or the whole vibration device 150 may be able to vibrate. Receiver devices 50 may be any type of radio receiver such as an antenna or any type of audio receiver such as a microphone, including a directional microphone. Radio receiver devices 50 may be, for example, a Wi-Fi device, a Zigbee device, or the like. Receiver devices 50 may be configured to receive multiple signals 15, which may be of different types.

The warning device 100 may include a belt 101 with four vibration devices 150a,150b,150c,150d and corresponding receiver devices 50a,50b,50c,50d positioned around the belt 101 as shown in FIG. 3. A processing device 110 may be wired or wirelessly connected to receiver devices 50a,50b, 50c,50d and vibration devices 150a,150b,150c,150d. Of course, the warning device 100 may include various other numbers and combinations of vibration devices 150 and corresponding receiver devices 50. Also, the warning device 100 may include a baseball cap, jacket, or other wearable item. It should also be noted that the warning device 100, or parts thereof, such as the processing device, may include a cell phone, camera, video player, MP3 player, game system, or similar electronic device, which may be worn by a user in a holster, on a belt clip, or the like. Of course, the warning device 100 may include a single electronic device that combines the capabilities of a cell phone, camera, game system, etc. The electronic device described above, i.e., cell phone, camera, etc., may be coupled with a vibration device 150 or may include a vibration device 150.

The processing device 110 of the warning device 100 may be a computer or other system that is adapted to process communications from each receiver device 50 and communicate with the vibration device or devices 150. The processing device 110 may be adapted to process multiple communications from receiver devices 50 receiving multiple radio/ and or audible signals 15. For example, the processing device 110 may be a digital signal processor or other high speed processing system. The processing device 110 may be wirelessly connected to the receiver devices 50 and/or vibration device 150. Alternatively, the processing device 110 may be connected by wire to the receiver devices 50 and/or vibration device 150.

The processing device 110 may include a phase shift detector 120 that is configured to determine the phase difference between audible signals 15 received by at least two receiver devices 50. The processing device 110 may use this phase information to determine the direction to an audible source 10 from the warning device 100. For example, the phase difference between the audible signals 15 received by a first receiver 50 and a second receiver 50 may be used to determine which receiver is further away from the audible source 10. If the audible signal 15 received by the first receiver 50 has a wave form that lags behind the wave form of the audible signal 15 received by the second receiver 50, then the second receiver 50 may be determined to be closer to the audible source 10 than the first receiver 50. Using this relative distance information, a direction to the audible source 10 from the warning device 100 may be calculated. Accordingly, the direction to the audible source 10 from the warning device 100 can be estimated based upon the phase difference between the wave forms received by each receiver device 50.

The processing device 110 may also include a signal strength detector 125 that is configured to determine the strength of radio and/or audible signals 15 received by receiver devices 50. The processing device 110 may use radio signal strength information to determine the direction to a radio source 10 from the warning device 100. The signal strengths of radio signals 15 received by receiver devices 50 may be different because of signal absorption by the user's body. A first receiver device 50 that receives a radio signal 15 directly will receive a stronger radio signal 15 compared with the radio signal strength of the same radio signal 15 that passes at least partially through the user's body and is received by a second receiver device 50. This is sometimes called the shadow effect. The receiver device 50 that receives the strongest radio signal 15 is the closest to the radio source 10, the receiver device 50 that receives the second strongest radio signal 15 is the second closest to the radio source 10, and so on. By comparing this signal strength information, a direction to the radio source 10 from the warning device 100 may be calculated. For instance, if two receiver devices 50 receive radio signals 15 having the same strength, then the radio source 10 may be an equal distance from each receiver device 50. As such, the direction to the radio source 10 from the warning device 100 may be shown as arrow A of FIG. 4. Of course, the frequency of the radio signal 15 must be in the range of values where the human body at least partially absorbs the signal. The frequency of the radio signal 15 may typically be around 3 MHz. However, other frequencies may be chosen, such as between 1 MHz to 30 MHz. Further, it may be beneficial to utilize frequency modulation to reduce the disturbance of multiple radio sources 10.

The processing device 110 may use audible signal strength information to determine the distance to an audible source 10 from the warning device 100. The processing device 110 may store audible signal strength information, such as the strength of audible signals 15 as they are transmitted from the audible source 10 or at a predetermined distance from the audible source 10. The stored signal information may be used to calculate the distance to an audible source 10 from the warning device 100. For example, using the inverse square method, the distance between the audible source 10 and the warning device 100 can be determined by knowing what the strength of the audible signal 15 is at a predetermined distance and by detecting the strength of the audible signal 15 at the warning device 100. Thus, the processing device 110 can determine the distance to an audible source 10 from the warning device 100 by receiving an audible signal 15.

Also, the processing device 110 may include an amplitude detector 130 that is configured to determine the amplitude of signals 15 received by receiver devices 50. The processing device 110 may use the amplitude information from a radio signal 15 to determine the distance to the radio source 10 from the warning device 100. The processing device 110 may store radio signal amplitude information, such as the amplitude of radio signals 15 as they are transmitted from the radio source 10 or at a predetermined distance from the radio source 10. The stored signal information may be used to calculate the distance to a radio source 10 from the warning device 100. For example, using the inverse square method, the distance between the radio source 10 and the warning device 100 can be determined by knowing what the amplitude of the radio signal 15 is at a predetermined distance and by detecting the strength of the radio signal 15 at the warning device 100. Therefore, the processing device 110 can determine the distance to a radio source 10 from the warning device 100 by receiving a radio signal 15.

The processing device 110 may use audible signal amplitude information to determine the distance to an audible source 10 from the warning device 100. The processing device 110 may store audible signal amplitude information, such as the amplitude of audible signals 15 as they are transmitted from the audible source 10 or at a predetermined distance from the audible source 10. The stored signal information may be used to calculate the distance to an audible source 10 from the warning device 100. For example, using the inverse square method, the distance between the audible source 10 and the warning device 100 can be determined by knowing what the amplitude of the audible signal 15 is at a predetermined distance and by detecting the strength of the audible signal 15 at the warning device 100. Therefore, the processing device 110 can determine the distance to an audible source 10 from the warning device 100 by receiving an audible signal 15.

Upon determining the distance and direction of the radio and/or audible source 10 from the warning device 100, the processing device 110 can communicate with and, thereby, cause the vibration device 150 to output a tactile message representative of the location of the radio and/or audible source 10.

FIG. 5 shows a method of alerting persons of obstacles and/or hazards 500. In FIG. 5, the radio and/or audible source transmits a radio and/or audible signal 501. The signal may be continuously transmitted, periodically transmitted, transmitted only when a person initiates transmission, or the like. The benefit of having a continuously transmitted or periodically transmitted radio and/or audible signal is that the user of the warning system is alerted to the corresponding obstacle or hazard, regardless of whether another person decides to transmit a signal. This may be particularly important for stationary or parked obstacles or hazards, such as shipping vehicles that are docked and being unloaded. In that case, the driver would not likely be able to alert the user by manually triggering a signal. In some cases, though, it may be appropriate to have the manual ability of sending signals. For a distribution center or the like, it may be beneficial for some vehicles to rely upon manual signaling, particularly to reduce the clutter of radio and audible signals. For example, a typical vehicle horn may act as an audible signal. Even so, it is generally safer for users when each signal source produces signals at a continuous rate.

Referring to FIG. 5, the receiver devices receive the radio and/or audible signals 505 and transfer the signals to the processing device where the direction and distance to the radio and/or audible source from the warning device are determined 510. Since signals transferred by the receiver devices to the processing device may be analog, the signals may first pass through an analog to digital converter before continuing on to the processing device. As discussed above, the processing device may include a phase shift detector that can measure the phase difference of audible signals received by receiver devices. Using this phase difference information, the processing device may determine the direction to the audible source from the warning device. The processing device may also include a signal strength detector that can measure the strength of signals received by receiver devices. Using the signal strength information, the processing device may determine the distance to the audible source from the warning device or may determine the direction to the radio source from the warning device. Also discussed above, the processing device may include an amplitude detector that can determine the amplitudes of signals received by receiver devices. Using this amplitude information, the processing device may determine the distance to a radio source. FIG. 5*a* shows a method of alerting persons of obstacles and/or hazards 550 where, upon determining the direction and distance to the radio and/or audible source from the warning device 510, the vibration devices may be individually selected 512 to provide the user with a tactile message.

Referring back to FIG. 5, using the determined direction and distance to the radio and/or audible source from the warning device, the processing device produces a vibration signal 515 and sends the vibration signal 520 to the appropriate vibration device or devices. After receiving a vibration signal, a vibration device is configured to vibrate 525 at whatever frequency, intensity, rhythm, or the like as instructed by the processing device. A vibration device or devices can provide the user with a tactile message, which alerts the user to the direction and distance to dangerous obstacles and hazards. A single vibration device may provide the user with the location of the source by vibrating portions of the device at varying intensities. For example, a single vibration device may only vibrate one of its side portions if the processing device determines that the source is located closest to that side. Various vibration devices positioned around a belt may provide the user with the location of the source by vibrating at different frequencies, different amplitudes, and the like. For example, FIG. 6 shows a belt 101 along with a signal source 10 that has produced signals 15,16. FIG. 7 shows a simplified, linear view of a belt 101 that has received signal 16 and processed signal 16 using the processing device 110. In FIG. 7, the processing device 110 has produced one vibration signal for the vibration device 150*c* based upon the determined distance and direction to the signal source 10 from the warning device 100. Therefore, vibration device 150*c* will be the only vibration device on belt 101 that generates vibrations. As such, the user will feel vibrations on the front vibration device 150*c*, which indicates to the user that the obstacle or hazard is in the direction of the front vibration device 150*c*. The intensity of the vibrations may indicate how far away the obstacle or hazard is from the warning device 100.

The vibration signal generated by the processing device 110 may include instructions for various vibration devices 150 regarding whether to vibrate or not, at what frequency to vibrate, or the like. The vibration signals may be sent to each vibration device 150 or any number of vibration devices 150. As shown in FIG. 7, the vibration signal may include a separation SP between wave segments. The separation between wave segments causes the vibration device 150 to vibrate in pulses. Basically, the greater the space between wave segments, the smaller the number of pulses over time. A high number of pulses may indicate, for example, that a signal source 10 is close, while a low number of pulses may indicate that a signal source 10 is far away. Of course, the vibration signal produced may be continuous or the like. In any case, the vibration signals cause vibration devices 150 to provide the user with a tactile message regarding the direction and distance of the warning device 100 to the signal source 10.

In FIG. 8, the front and right receivers (50c and 50d, respectively) receive a radio signal 15. Since the front receiver 50c is closer to the radio source 10, the radio signal 15 received by the right receiver 50d has less strength compared with the radio signal 15 received by the front receiver 50c. Using the detected amplitudes and signal strengths, the processing device 110 can determine the distance and direction to the radio source 10 from the warning device 100. After making this determination, the processing device 110 may send out vibration signals to the front and right vibration devices 150c, 150d to vibrate. The front vibration device 150c may be instructed to vibrate at a greater frequency compared with the right vibration device 150d since the front receiver device 50c is determined to be closer to the radio source 10. The front and right vibration devices 150c, 150d may also be instructed to vibrate at intensities that give the user a sense of the distance of the radio source 10 from the warning device 100. In this instance, the front vibration device 150c and right vibration device 150d may vibrate at a high intensity if the radio source 10 is determined by the processing device 110 to be close and, therefore, an immediate threat to the user. Of course, the vibration devices 150 may be instructed to vibrate in various other manners, as long as the user can interpret the vibrations to avoid the hazard or obstacle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A warning system, comprising:
   a radio source configured to transmit a radio signal; and
   a warning device, comprising,
      at least one vibration device;
      at least two receiver devices configured to receive the radio signal; and
      a processing device operably coupled to at least two receiver devices and at least one vibration device, wherein the processing device is configured to determine at least a direction and a distance to the radio source from the warning device and configured to transmit a vibration signal to at least one vibration device based upon the determined direction and distance to the radio source from the warning device, wherein the direction is based at least in part on the relative signal strength of the radio signal detected by the two receiver devices.

2. The warning system of claim 1, wherein the processing device comprises a signal strength detector configured to determine the strength of signals received by receiver devices.

3. The warning system of claim 2, wherein the processing device is configured to determine the direction to the radio source from the warning device based at least partially upon the determined strength of signals received by receiver devices.

4. The warning system of claim 1, wherein the processing device comprises an amplitude detector configured to determine the amplitude of signals received by receiver devices.

5. The warning system of claim 4, wherein the processing device is configured to determine the distance to the radio source from the warning device based at least partially upon the determined amplitude for the signals received by receiver devices.

6. The warning system of claim 1, wherein the radio source comprises a component of a vehicle.

7. The warning system of claim 1, wherein the radio source comprises a Wi-Fi enabled device.

8. The warning system of claim 1, wherein the radio source comprises a Zigbee device.

9. The warning system of claim 1, wherein the warning device comprises a belt having at least four vibration devices positioned around the belt.

10. The warning system of claim 9, wherein the at least four vibration devices each have a corresponding receiver device.

\* \* \* \* \*